US006041499A

United States Patent [19]

Matsuura et al.

[11] Patent Number: 6,041,499

[45] Date of Patent: Mar. 28, 2000

[54] METHOD FOR MANUFACTURING A CYLINDER FOR TWO-STROKE INTERNAL COMBUSTION ENGINE AND THE CYLINDER MANUFACTURED THEREBY

[75] Inventors: Fujihiro Matsuura, Kanagawa; Tomohiro Ohtani; Minoru Yonekawa, both of Tokyo, all of Japan

[73] Assignee: Kioritz Corporation, Tokyo, Japan

[21] Appl. No.: 09/038,876

[22] Filed: Mar. 11, 1998

[30] Foreign Application Priority Data

Mar. 14, 1997 [JP] Japan .................................... 9-061371

[51] Int. Cl.$^{7}$ ...................................................... B23P 15/00

[52] U.S. Cl. .................................... 29/888.06; 29/888.01; 29/557

[58] Field of Search ............................ 29/888.06, 888.01, 29/428, 527.6, 527.4, 557

[56] References Cited

U.S. PATENT DOCUMENTS

| | | | |
|---|---|---|---|
| 4,011,852 | 3/1977 | Rasch | 29/888.06 |
| 4,419,801 | 12/1983 | Yamashita et al. | 29/888.06 |
| 4,653,161 | 3/1987 | Sanchez | 29/888.06 |

FOREIGN PATENT DOCUMENTS

| | | |
|---|---|---|
| 58155114 | of 0000 | Japan . |
| 60148657 | of 0000 | Japan . |

*Primary Examiner*—Irene Cuda
*Attorney, Agent, or Firm*—Baker Botts L.L.P.

[57] ABSTRACT

A method for manufacturing a cylinder for a two-stroke internal combustion engine provided with a pair of hollow scavenging passages, which comprises the steps of casting a raw cylinder body provided with the hollow scavenging passages and forming scavenging ports and/or air-fuel mixture inlet ports communicating respectively with said scavenging passages in the raw cylinder body by means of non-contact machining method.

8 Claims, 6 Drawing Sheets

METHOD FOR MANUFACTURING A CYLINDER FOR TWO-STROKE INTERNAL COMBUSTION ENGINE AND THE CYLINDER MANUFACTURED THEREBY

BACKGROUND OF THE INVENTION

1. Field of the Invention

The present invention relates to a method of manufacturing a cylinder for a two-stroke internal combustion engine of relatively small size and to a cylinder for such a two-stroke engine. In particular, the present invention relates to a method for manufacturing an aluminum alloy cylinder which is provided with a pair of hollow scavenging passages and to a cylinder to be manufactured by the method.

2. The Prior Art

FIG. 6 illustrates one example of a cylinder for an air-cooled two-stroke gasoline engine of relatively small size that has been conventionally employed in a portable working machine. This conventional cylinder 1' is constituted by an integrated body having a cylinder bore 9 into which a piston (not shown) is adapted to be inserted, a block portion 2 provided with columnar bulged wall portions 2*a*, and a head portion 3 provided with a combustion chamber 4 of so-called squish dome-shape. Further, the block portion 2 is provided with a suction port 5 and an exhaust port 6, which face towards each other and are offset vertically from each other. The block portion 2 is further provided at the inner wall thereof with a pair of hollow scavenging passages 7 facing towards each other and displaced circumferentially from the suction port 5 and the exhaust port 6 by 90 degrees of arc. The scavenging passages 7 are formed in respective ones of the aforementioned columnar bulged wall portions 2*a*, thus forming hollow portions therein. A pair of openings 7*a* for introducing air-fuel mixture from a crank chamber (not shown) into the scavenging passages 7 are formed at the lower ends of the bulged wall portions 2*a*. Further, a pair of scavenging ports 8 are formed at the upper portions of the bulged wall portions 2*a* so as to communicate with the respective scavenging passages 7. Such a conventional cylinder 1' is of the so-called walled scavenging passage type cylinder structure.

In the mono-block casting of the cylinder 1', provided with the scavenging passages 7, by means of mold casting, either a collapsible core such as a shell core is employed to form the hollow scavenging passages 7 or a movable core mold which is complicated in structure is employed.

Since the scavenging passages 7 are provided with the scavenging ports 8, the mold is inevitably accompanied with an undercut portion for molding the scavenging ports 8. Thus in the mono-block casting of the cylinder 1' having scavenging passages 7, the employment of a core in addition to the mold is required in any event. As a result, there are problems in that the preparatory work for the casting is rather troublesome and the manufacturing cost for the cylinder is relatively high. In other words, it has been impossible to adopt an efficient casting method, such as a high-pressure die casting method, which is high in efficiency and low in manufacturing cost.

It may be conceivable to form the scavenging ports 8 by means of a contact working method using a revolving cutting tool, etc. However, since the space is too narrow to suitably insert the tool, the work is very difficult. Hence, it is difficult to expect a high precision working.

SUMMARY OF THE INVENTION

The present invention has been made under the circumstances mentioned above. It is therefore an object of the present invention to provide an efficient and low cost method for manufacturing a cylinder for a two-stroke internal combustion engine.

Another object of this invention is to provide a cylinder which can be manufactured by making use of such method.

Namely, according to the present invention, there is provided a method for manufacturing a cylinder for a two-stroke internal combustion engine, which method comprises the steps of casting a raw cylinder body provided with a pair of hollow scavenging passages, each extending from a bottom opening of a cylinder block toward a cylinder head, and forming scavenging ports communicating respectively with the scavenging passages in the raw cylinder body by means of a non-contact machining method, wherein the casting step is performed by means of a high-pressure die casting method, and the non-contact machining of the scavenging ports is performed subsequent to bore-machining of the cylinder bore.

According to a preferred embodiment of the present invention, there is further provided a method for manufacturing a cylinder for a two-stroke engine, wherein the method includes the steps of casting a raw cylinder body provided with a pair of hollow scavenging passages, each extending from a bottom opening of a cylinder block toward a cylinder head, forming scavenging ports and air-fuel mixture inlet ports, each communicating respectively with the scavenging passages in the raw cylinder body by means of a non-contact machining method, and closing a bottom opening of each of the scavenging passages with a blank plug.

According to th e aforementioned methods of the present invention, a raw cylinder body provided only with hollow scavenging passages, without accompanying scavenging ports or air-fuel mixture inlet ports, is cast at first, and then the scavenging ports or the air-fuel mixture inlet ports are formed by means of a non-contact machining method. Therefore, it is possible to easily perform the casting of the raw cylinder body by means of high-pressure die casting, thus making it possible to manufacture the raw cylinder body in a high efficiency manner and to greatly save in the manufacturing cost thereof.

The non-contact machining method, such as electric discharge machining, enables an extremely high precision working to be performed by precisely controlling the location of electrodes, etc. and/or by making use of a numerically controlled machine, etc. Accordingly, the scavenging ports as well as the air-fuel mixture inlet ports can be precisely worked. Even if the cylinders to be manufactured differ in type, a scavenging port as well as an air-fuel mixture inlet port of desired shape can be precisely formed in conformity with the specification of each type by simply altering the operation of the numerically controlled machine, etc. Additionally, even if the scavenging port or the air-fuel mixture inlet port differ in shape and type, the same mold for the casting can be utilized, as it is used for the manufacture of the raw cylinder body. Thus the cost of manufacture of the cylinder can be greatly reduced.

Furthermore, since the scavenging ports for the hollow scavenging passages of the cylinder for a two-stroke internal combustion engine are formed by means of a non-contact machining method, such as electric discharge machining, a suitable degree of ruggedness can be formed on the surface of the scavenging port, thus bringing about an excellent effect in diffusing the air-fuel mixture to be introduced into the cylinder bore.

DETAILED DESCRIPTION OF THE PREFERRED EMBODIMENTS OF INVENTION

The present invention will be further explained with reference to the drawings depicting illustrative embodiments of the invention. In all of the drawings, the same members or the same functions are identified by the same reference numbers.

Figure 1:
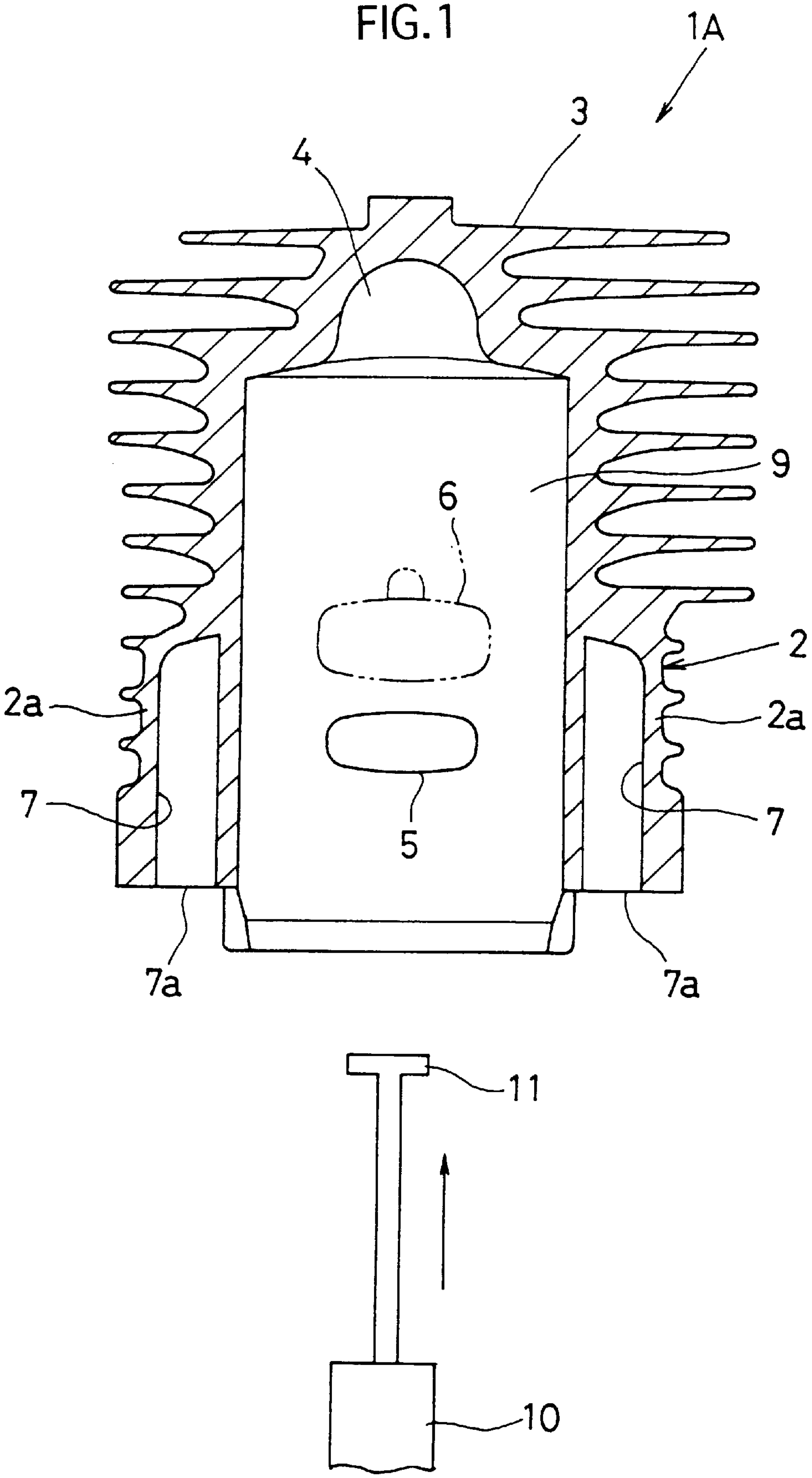
FIG. 1 is a longitudinal sectional view illustrating one embodiment of a raw cylinder body for manufacturing a cylinder for a two-stroke internal combustion engine according to the present invention.

FIG. 1 shows a raw cylinder body 1A that has been manufactured by a casting step in the manufacturing method of a cylinder for a two-stroke internal combustion engine according to the present invention. This casting step is performed by means of a high-pressure die casting method in which a metal melt is injected at a high pressure into a mold. The raw cylinder body 1A in this embodiment is formed of an aluminum alloy.

The raw cylinder body 1A is constituted by an integrated body (monoblock) having a cylinder bore 9 into which a piston (not shown) is adapted to be inserted, a block portion 2 provided with columnar bulged wall portions 2*a*, and a head portion 3 provided with a combustion chamber 4 of so-called squish dome-shape. Further, the block portion 2 is provided with a suction port 5 and an exhaust port 6, both facing towards each other and being offset vertically from one another. The block portion 2 is further provided at the inner wall thereof with a pair of hollow scavenging passages 7 facing towards each other and displaced circumferentially from the suction port 5 and exhaust port 6 by 90 degrees of arc. The scavenging passages 7 are formed in the aforementioned columnar bulged wall portions 2*a* of the raw cylinder body 1A, thus forming hollow portions therein. A pair of openings 7*a* are formed respectively at the lower ends of the bulged wall portions 2*a* so as to communicate with the scavenging passages 7. The upper ends of the scavenging passages 7 are closed by the bulged wall portions 2*a*, thus forming a pair of closed passages.

Since this raw cylinder body 1A provided with the closed hollow scavenging passages 7 does not include an undercut portion in the hollow scavenging passages 7, the raw cylinder body 1A and the hollow scavenging passages 7 can be cast as a monoblock by casting, such as by high-pressure die casting, without requiring the use of a core such as a shell core or a special movable core.

The raw cylinder body 1A cast by means of a high-pressure die casting method is subsequently subjected to machining, according to which the joint portion thereof with a crank case (not shown) and the inner circumferential wall of the cylinder bore 9 into which a piston is inserted are machine-finished.

The raw cylinder body 1A thus finish-machined is then subjected to a non-contact machining method, preferably electric discharge machining, wherein a pair of scavenging ports 8 constituting the air-fuel mixture outlet ports of the hollow scavenging passages 7 are formed, thus providing a walled scavenging passage type cylinder 1.

Figure 2:
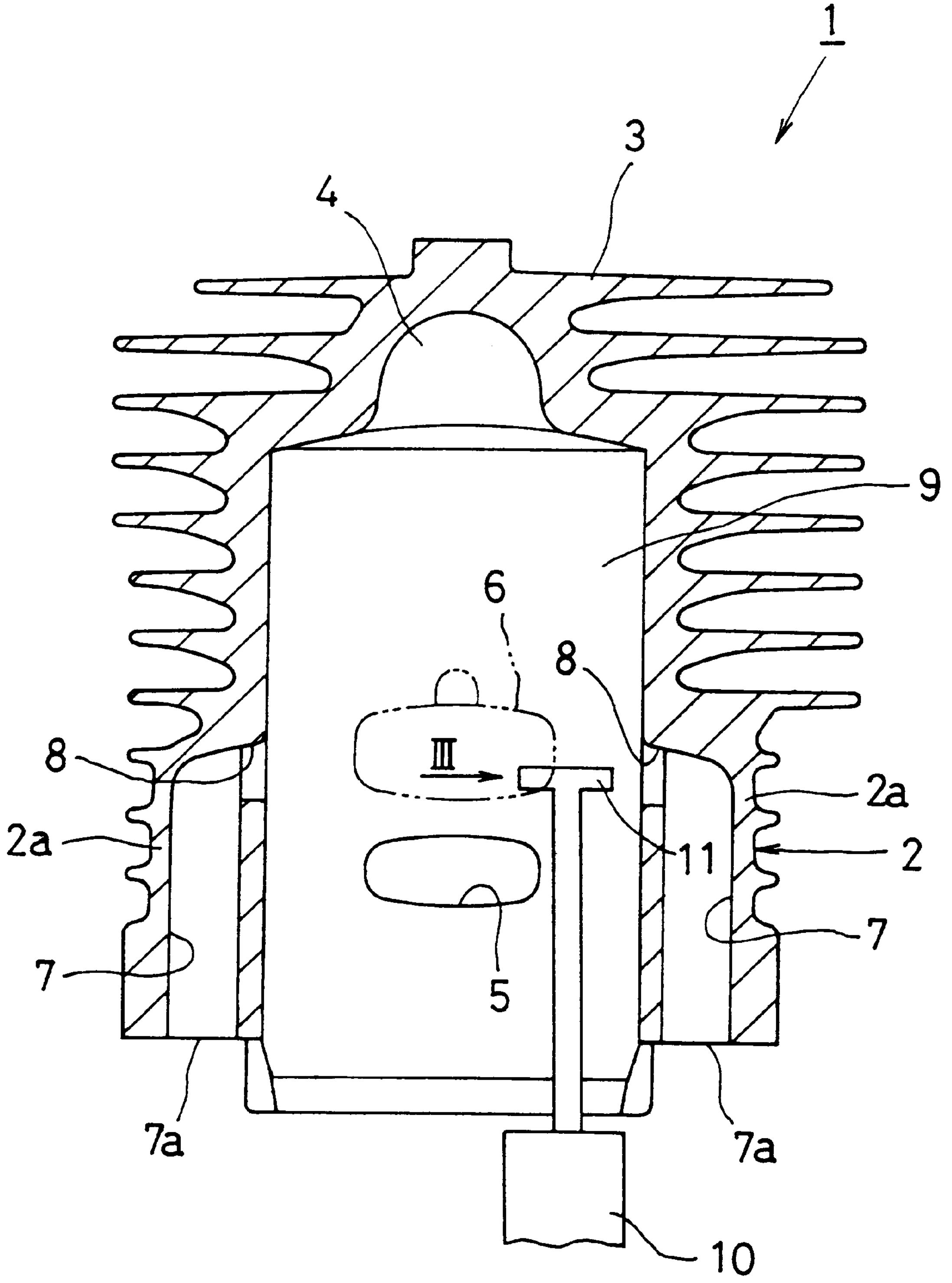
FIG. 2 is a longitudinal sectional view illustrating one embodiment of a finished cylinder for a two-stroke internal combustion engine according to the present invention.
Figure 3:
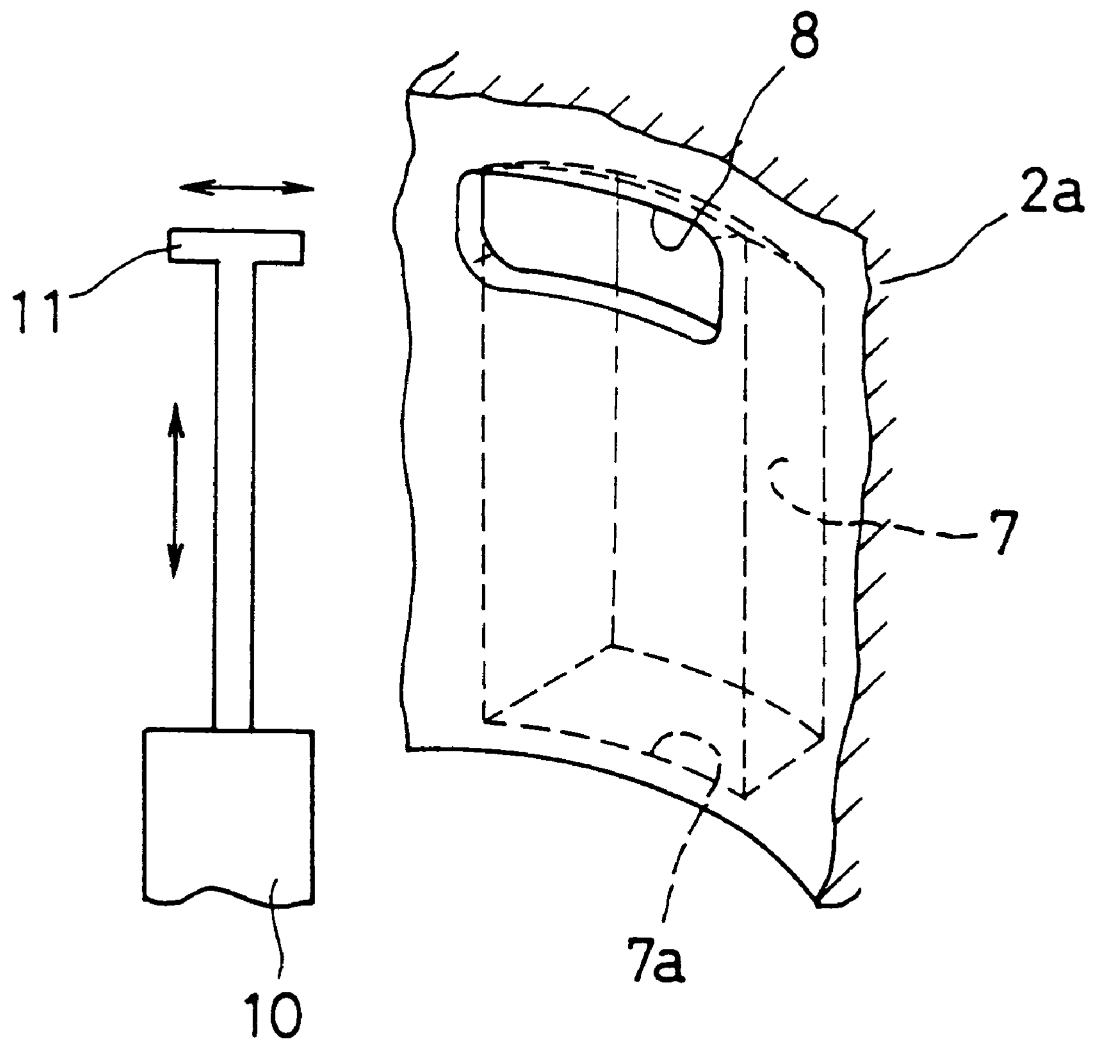
FIG. 3 is a partial perspective view of the scavenging passage portion as viewed in the direction of the arrow III in FIG. 2.

FIGS. 2 and 3 illustrate the cylinder 1 provided with the scavenging ports 8 that have been formed by means of electric discharge machining. This cylinder 1 is a so-called walled scavenging passage type cylinder, wherein an air-fuel mixture from a crank chamber (not shown) of the crank case disposed on the lower side of the block 2 is introduced via the openings 7*a* of the scavenging passages 7 and the scavenging ports 8 into the cylinder bore 9.

The aforementioned electric discharge machining can be carried out by inserting a tool 10 provided with an electrode 11 (made of copper for instance) into the cylinder bore 9 of the raw cylinder body 1A, cast by means of a high-pressure die casting method as described above, and positioned close to the bulged wall portions 2*a*. Then, an electric discharge is allowed to take place between the electrode 11 and the raw cylinder body 1A, whereby the scavenging ports 8 are formed from the inside of the bulged wall portion 2*a* towards the scavenging passages 7. In this case, the distance between the electrode 11 and the inner surface of the bulged wall portions 2*a* to be worked should preferably be set to several microns to scores of microns, and the etching work on the bulged wall portions 2*a* is effected by the accumulation of erosions caused by the discharge generated by a discharge current of a highly (frequently) repeated number of pulses.

As for the electrode 11, silver/tungsten or graphite, etc. may be employed instead of copper.

It is also possible to perform the electric discharge machining by inserting the electrode 11 into the scavenging passage 7.

It is possible, through the control of the movement of the electrode 11 by making use of a numerically controlled machine (not shown), to precisely form the scavenging port 8 of any desired shape.

Although there is no particular limitation as to the shape of the electrode 11, the T-shaped electrode 11 as shown in FIG. 1 is preferable, because the etching work of both left and right scavenging ports 8 can be easily performed by simply moving the electrode 11 from left to right linearly without changing the direction of the electrode 11.

Figure 4:
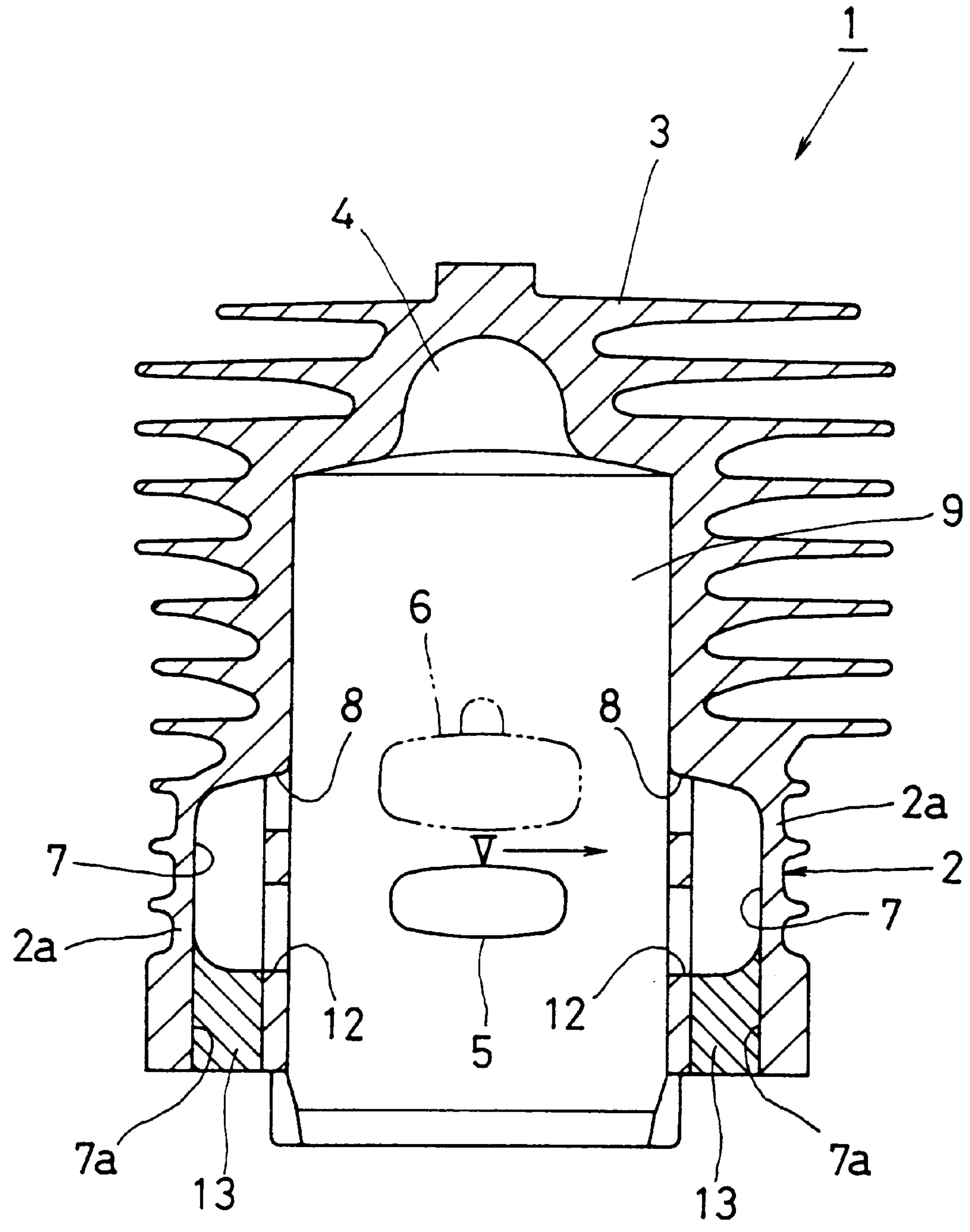
FIG. 4 is a longitudinal sectional view illustrating another embodiment of a finished cylinder for a two-stroke internal combustion engine according to the present invention.
Figure 5:
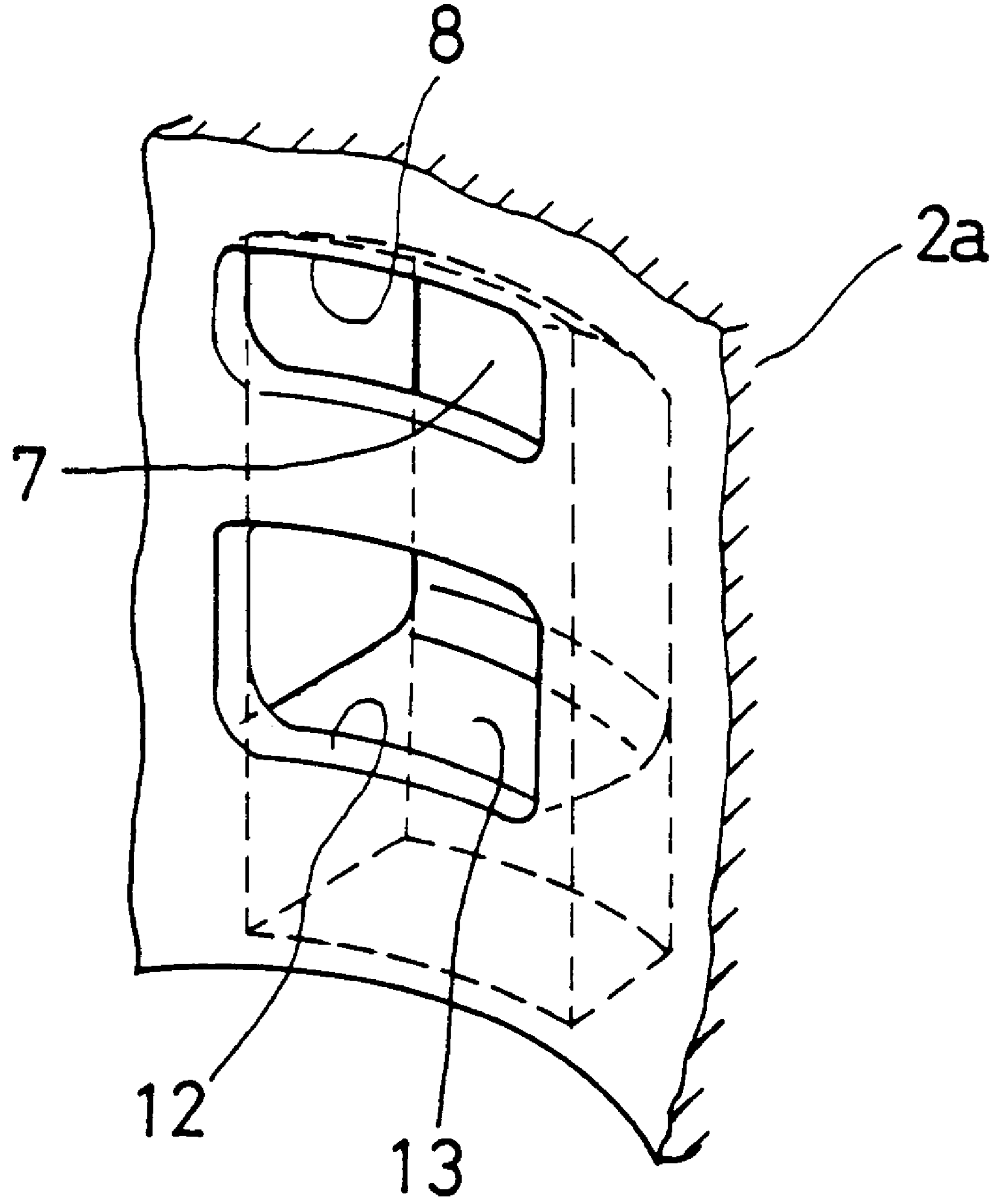
FIG. 5 is a partial perspective view of the scavenging passage portion as viewed in the direction of the arrow V in FIG. 4.
Figure 6:
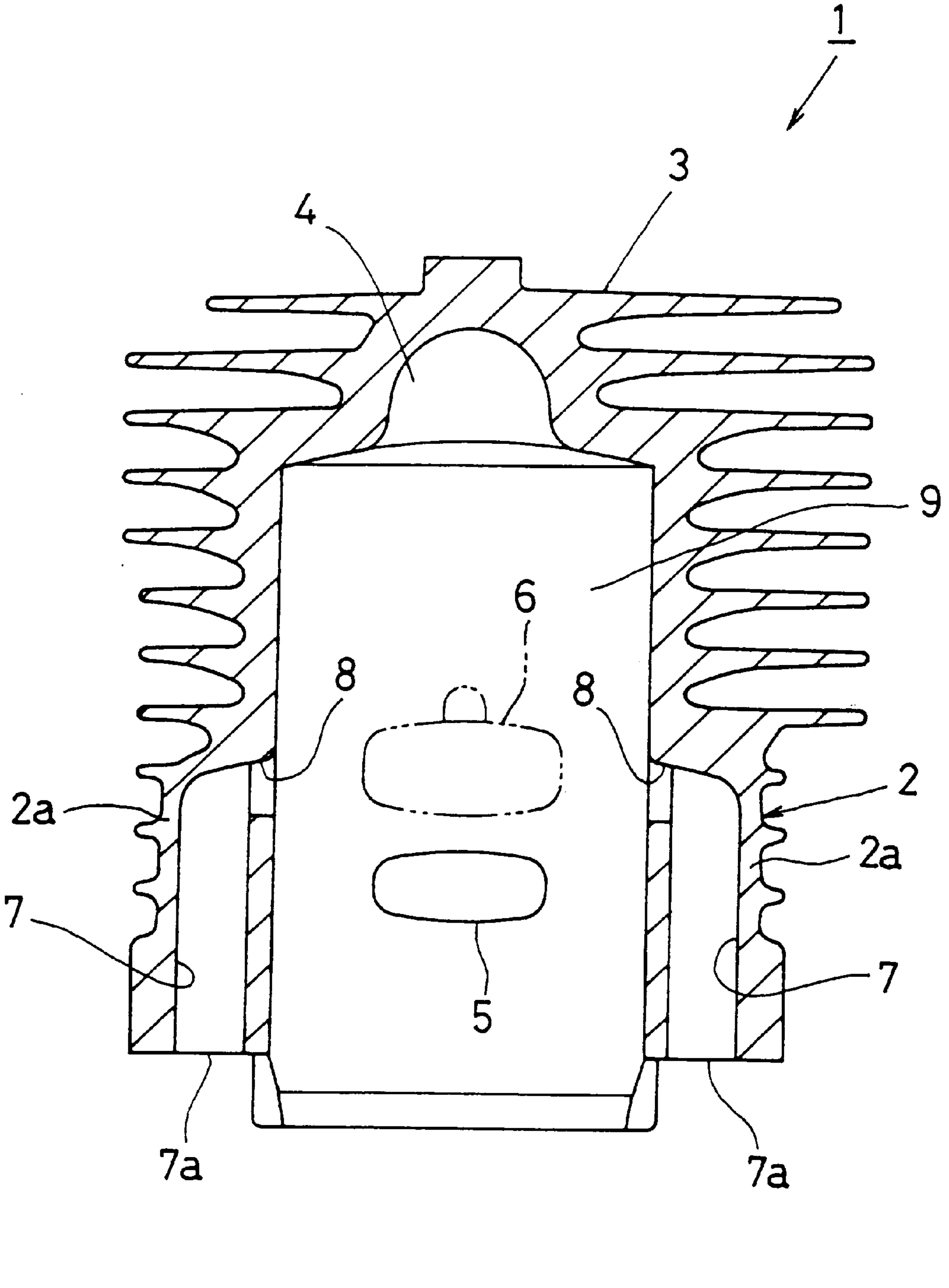
FIG.6 PRIOR ART
FIG. 6 is a longitudinal sectional view of a finished cylinder for a two-stroke internal combustion engine according to the prior art.

FIGS. 4 and 5 illustrate a cylinder 1 which has been worked by means of an electric discharge machining according to another embodiment of this invention. This cylinder 1 is a so-called internal cooling type cylinder, wherein each of the bulged wall portions 2*a* of the cylinder bore 9 is provided with air-fuel mixture inlet ports 12 for introducing air-fuel mixture from vent holes formed on a skirt portion of an internal cooling type piston (not shown) to the hollow scavenging passages 7, and is also provided with a scavenging ports 8. Namely, a C-shaped passage is constituted by the hollow scavenging passage 7 together with the scavenging port 8 and the air-fuel mixture inlet port 12. According to this cylinder 1, air-fuel mixture is introduced from the air-fuel mixture inlet ports 12 located at a lower portion of the cylinder bore 9 into the hollow scavenging passages 7 and is discharged from the scavenging ports 8 located at an upper portion of the cylinder bore 9 into the cylinder bore 9.

In the manufacture of the internal cooling type cylinder 1 of FIGS. 4 and 5, the scavenging ports 8 and the air-fuel mixture inlet ports 12 are formed at first in the raw cylinder body 1A (FIG. 1) by means of electric discharge machining, and then a blank plug 13 formed of a suitable material, such as an aluminum alloy or a synthetic resin, is inserted into the opening 7*a* of each of the hollow scavenging passages 7, thereby hermetically closing the openings 7*a*. The hollow scavenging passages 7 are thereby formed into the aforementioned C-shaped passages, thus completing the internal cooling type cylinder 1.

According to the aforementioned methods of manufacturing the cylinder for a two-stroke internal combustion engine of the present invention, a raw cylinder body provided only with the hollow scavenging passages without the accompanying scavenging ports or the air-fuel mixture inlet ports is cast at first, and then the scavenging ports and/or the air-fuel mixture inlet ports are formed by means of electric discharge machining. Therefore, it is possible to easily cast the raw cylinder body by means of high-pressure die casting, thus making it possible to manufacture the raw cylinder body in a highly efficient manner and to minimize the manufacturing cost thereof.

Since the electric discharge machining enables an extremely high precision working to be performed by precisely controlling the location of electrodes and/or by making use of a numerically controlled machine, the scavenging ports as well as the air-fuel mixture inlet ports can be precisely worked on the same raw cylinder body. Furthermore, even if the cylinder to be manufactured differs in type, a scavenging port as well as an air-fuel mixture inlet port of desired shape can be precisely formed in conformity with the specification of each type by simply altering the operation of the numerically controlled machine. Additionally, even if the scavenging port or the air-fuel mixture inlet port differs in shape and type, the same mold for the casting can be utilized as it is used for the manufacture of the raw cylinder body. Thus the cost of manufacturing the cylinder can be greatly reduced.

Additionally, if the cylinder is manufactured by making use of an aluminum alloy as a raw material and by means of a high-pressure die casting method, then, if the scavenging ports and/or the air-fuel mixture inlet ports are formed by means of electric discharge machining, it is possible to further enhance the efficiency in the manufacture of the cylinder and to further minimize the manufacturing cost, since an aluminum alloy can be machined by means of electric discharge machining at a speed of three times as high as that of iron.

It may be required to perform chamfering of each port to be formed in the cylinder in the working step of the raw cylinder body. However, this chamfering can be performed simultaneously with the step of forming the scavenging port or the air-fuel mixture inlet port in a single step by means of electric discharge machining.

Further, the surface of the brim portion of the scavenging port is required to be roughened to a suitable degree in order to enhance the diffusion of the air-fuel mixture in the cylinder bore. Advantageously, the worked surface by the electric discharge machining is spontaneously roughened to a suitable degree, i.e. 10 $\mu$m to 30 $\mu$m in maximum height. Therefore, the scavenging port formed by electric discharge machining is effective in enhancing the diffusion effect of air-fuel mixture.

Furthermore, since the bore-machining of the cylinder bore of the cast raw cylinder body is performed prior to the step of forming the scavenging ports or the air-fuel mixture inlet ports by means of electric discharge machining, the scavenging ports or the air-fuel mixture inlet ports are not yet formed at the occasion of performing bore machining. Thus the magnitude of intermitting cutting work in the bore-machining can be minimized, thus facilitating the bore-machining process.

In the foregoing explanation, the present invention has been explained with reference to the aforementioned embodiments. However, the present invention should not be construed to be limited to these embodiments, but may be variously modified within the spirit and scope of the present invention as defined in the claims.

For example, although the scavenging ports and the air-fuel mixture inlet ports are described as being formed by means of electric discharge machining, it is also possible to form these ports by means of laser beam machining or electro-chemical machining, and at the same time, to make the machined surface of the scavenging port roughened to a suitable degree by employing such alternative machining methods.

It is also possible to employ other suitable non-contact machining methods.

As explained above, according to the present invention, a raw cylinder body provided with a hollow scavenging passage without an accompanying scavenging port or an air-fuel mixture inlet port is cast-molded at first, and then the scavenging port and/or the air-fuel mixture inlet port is formed by means of a non-contact machining method. Therefore, it is possible to manufacture the cylinder in a highly efficient manner and to greatly minimize the manufacturing cost thereof.

Additionally, since the scavenging port is formed by means of electric discharge machining, the surface of the scavenging port can simultaneously be roughened to a suitable degree, thereby making it possible to enhance the diffusion of the air-fuel mixture to be injected into the cylinder bore.

We claim:

1. A method for manufacturing a cylinder for a two-stroke internal combustion engine, comprising the steps of:

casting a raw cylinder body having a lower block portion and an upper head portion integral and unitary with the lower block portion, a bore and a pair of hollow scavenging passages, each extending from a bottom opening of the lower block portion towards the upper head portion; and forming scavenging ports communicating respectively with said hollow scavenging passages in the raw cylinder body by means of a non-contact machining method selected from the group consisting of electric discharge machining laser beam machining and electro-chemical machining.

2. A method for manufacturing a cylinder for a two-stroke internal combustion engine, comprising the steps of:

casting a raw cylinder body having a lower block portion and an upper head portion integral and unitary with the lower block portion, a bore and a pair of hollow scavenging passages, each extending from a bottom opening of the lower block portion towards the upper head portion; and forming scavenging ports and air-fuel mixture inlet ports, each communicating respectively with said hollow scavenging passages in the raw cylinder body by means of a non-contact machining method selected from the group consisting of electric discharge machining, laser beam machining and electro-chemical machining.

3. The method according to claim 1 or 2, wherein the casting of said raw cylinder body is performed by means of high-pressure die casting method.

4. The method according to claim 1 or 2 further comprising the step of bore-machining said cylinder bore prior to said step of non-contact machining.

5. The method according to claim 2, wherein a bottom opening of each of said hollow scavenging passage is closed with a blank plug subsequent to the non-contact machining of said scavenging ports and said air-fuel mixture inlet ports.

6. The method according to claim 1 or 2, wherein the non-contact machining method is performed by means of electric discharge machining.

7. The method according to claim 1 or 2, wherein the non-contact machining method is performed by means of laser beam machining.

8. The method according to claim 1 or 2, wherein the non-contact machining method is performed by means of electro-chemical machining.

* * * * *